United States Patent
Imura

(10) Patent No.: US 8,007,952 B2
(45) Date of Patent: Aug. 30, 2011

(54) FUEL CELL

(75) Inventor: Shinichiro Imura, Ora-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 1191 days.

(21) Appl. No.: 11/691,223

(22) Filed: Mar. 26, 2007

(65) Prior Publication Data

US 2007/0224489 A1 Sep. 27, 2007

(30) Foreign Application Priority Data

Mar. 27, 2006 (JP) .................................. 2006-086627
Sep. 14, 2006 (JP) .................................. 2006-249294

(51) Int. Cl.
*H01M 8/10* (2006.01)

(52) U.S. Cl. ....................................... 429/482; 429/483
(58) Field of Classification Search .................. 429/479, 429/480, 483, 490, 491, 507, 508, 517, 523, 429/532, 534, 482
See application file for complete search history.

(56) References Cited

U.S. PATENT DOCUMENTS

| | | | | |
|---|---|---|---|---|
| 5,587,209 A | * | 12/1996 | Soga et al. | 427/503 |
| 5,718,984 A | * | 2/1998 | Iwase et al. | 429/49 |
| 5,989,741 A | * | 11/1999 | Bloomfield et al. | 429/465 |
| 2004/0081878 A1 | * | 4/2004 | Mardilovich et al. | 429/34 |
| 2005/0282047 A1 | * | 12/2005 | Kimura et al. | 429/4 |

FOREIGN PATENT DOCUMENTS

JP 2005-209584 8/2005

* cited by examiner

*Primary Examiner* — Jennifer K. Michener
*Assistant Examiner* — Carlos Barcena
(74) *Attorney, Agent, or Firm* — Dittahavong Mori & Steiner, P.C.

(57) ABSTRACT

A DMFC is provided in which the structure is simplified and the thickness is reduced without impairing diffusibility of fuel, air and generated products. An anode catalyst layer and a cathode catalyst layer sandwich an electrolyte membrane. Liquid fuel stored in a fuel chamber is directly supplied to the anode catalyst layer. Current collectors are respectively provided adjacent to the anode catalyst layer and the cathode catalyst layer. Each of the current collectors is formed of a flat conductive sheet in which a plurality of fine pores are provided to extend through the current collector in a direction substantially perpendicular to the planar direction.

1 Claim, 12 Drawing Sheets

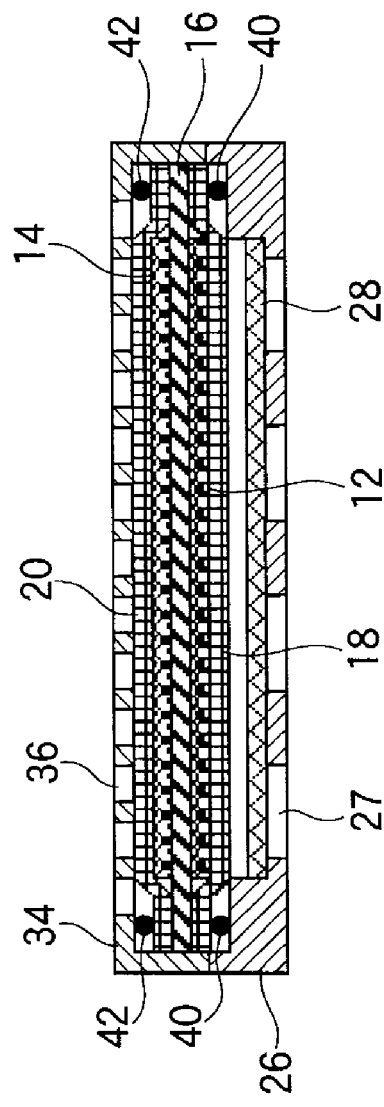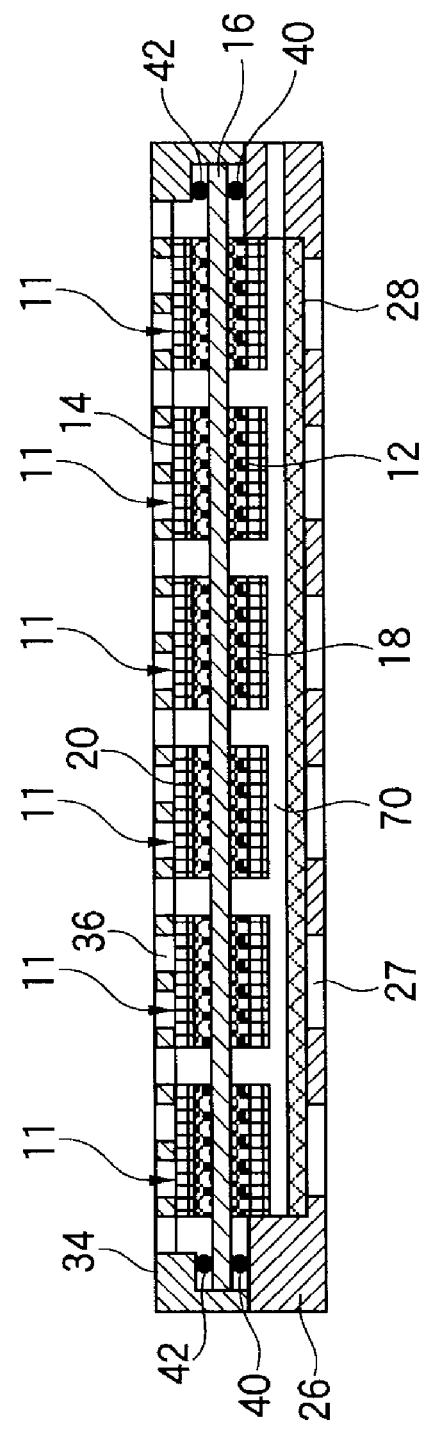
FIG.2A
FIG.2B

ID
FUEL CELL

BACKGROUND OF THE INVENTION

1. Field of the Invention

The present invention relates to a fuel cell in which liquid fuel is directly supplied to an anode.

2. Description of the Related Art

A fuel cell is a device that generates electricity from hydrogen and oxygen and achieves highly efficient power generation. Unlike conventional power generation, a fuel cell allows direct power generation that does not require conversion into thermal energy or kinetic energy. As such, even a small-scale fuel cell achieves highly efficient power generation. Other features unique to a fuel cell include less emission of nitrogen compounds, etc. and environmental benefits due to small noise and vibration. As described, a fuel cell is capable of efficiently utilizing chemical energy in fuel and as such environmentally friendly. Fuel cells are envisaged as an energy supply system for the twenty-first century and have gained attention as a promising power generation system that can be used in a variety of applications including space applications, automobiles, mobile appliances and large and small scale power generation. Serious technical efforts are being made to develop practical fuel cells.

Of various types of fuel cells, a solid polymer fuel cell is unique in its low operating temperature and high output density. Recently, direct methanol fuel cells (DMFC) are especially highlighted. In a DMFC, methanol water solution as a fuel is not reformed and is directly supplied to an anode so that electricity is produced by an electrochemical reaction induced between the methanol water solution and oxygen. Reaction products resulting from an electrochemical reaction are carbon dioxide being emitted from an anode and generated water emitted from a cathode (see patent document No. 1). Methanol water solution is richer in energy per unit area than hydrogen. Moreover, it is suitable for storage and poses little danger of explosion. Accordingly, it is expected that methanol water solution will be used in power supplies for automobiles, mobile appliances (cell phones, notebook personal computers, PDAs, MP3 players, digital cameras, electronic dictionaries (books)) and the like.

FIG. 7 is a sectional view showing the schematic structure of a related-art DMFC. The DMFC has a membrane electrolyte assembly provided with a fuel electrode 530 and an air electrode 560 sandwiching an electrolyte membrane 500. The fuel electrode 530 includes an anode catalyst layer 510 and an anode diffusion layer 520. The air electrode 560 includes a cathode catalyst layer 540 and a cathode diffusion layer 550. The fuel electrode 530 is held in place by ribs 572 provided in a casing 570. Similarly, the air electrode 560 is held in place by ribs 582 provided in a casing 580. The illustrated structure is disclosed in patent document No. 1.

[patent document No. 1]
JP 2005-209584

In the related-art DMFCs, nut and bolt clamping is required in order to reduce contact resistance in a diffusion layer, a catalyst layer and an electrolyte membrane. This calls for rigidity of the DMFC components sufficient to withstand clamping pressure. Securing rigidity also requires ribs for holding current collectors in place. As a result, the DMFC has to become more complex and less compact in structure, preventing diffusion of fuel, air and generated products. There are also problems in that size reduction and maintenance are difficult, and the cost is increased. A phenomenon called methanol crossover is known in which methanol flows through an electrolyte membrane along with protons. Methanol crossover causes waste of methanol water solution (liquid fuel), leading to reduction in power generation efficiency. Methanol crossover is more likely to occur when an electrolyte membrane swells. Therefore, suppression of swelling of an electrolyte membrane is a technical challenge to be achieved in order to prevent methanol crossover.

As mentioned before, DMFCs are expected to power portable devices. Therefore, further size reduction and thickness reduction are essential to advance practical applications of DMFCs.

SUMMARY OF THE INVENTION

In this background, a general purpose of the present invention is to provide a technology for simplifying the structure of a DMFC, reducing the thickness thereof, preventing swelling of an electrolyte membrane and suppressing methanol crossover, without impairing diffusibility of fuel, air and generated products.

An embodiment of the present invention relates to a fuel cell. The fuel cell comprises: an electrolyte membrane; an anode catalyst layer and a cathode catalyst layer sandwiching the electrolyte membrane; a fuel chamber storing fuel directly supplied to the anode catalyst layer; and current collectors which are respectively in contact with the anode catalyst layer and the cathode catalyst layer and each of which is formed of a flat conductive sheet in which a plurality of fine pores are provided to extend through the current collector in a direction substantially perpendicular to the planar direction.

According to the fuel cell of this embodiment, close contact between the current collector and the catalyst layer is maintained without using a support such as ribs. As a result of reducing the number of members to achieve close contact between the current collector and the catalyst layer, the structure of the fuel cell is simplified, maintenance is made easy and production cost is reduced. The provision also reduces load on the casing of the fuel cell. Consequently, the casing, the catalyst layer, etc. of the fuel cell can be made thin, resulting in a compact fuel cell. By ensuring close contact of the current collector and thus preventing swelling of the electrolyte membrane, methanol crossover is suppressed.

A part or the entirety of the current collector of the fuel cell according to the embodiment may be embedded in the anode catalyst layer or the cathode catalyst layer.

According to this embodiment, close contact between the current collector and the catalyst layer is promoted because the current collector is anchored in the catalyst layer.

The surface of the current collector of the fuel cell according to this embodiment may be coated with a conductive material having corrosion resistance.

According to this embodiment, the conductivity of the current collector is improved. Moreover, the metal constituting the current collector is prevented from being dissolved so that the operating stability of the fuel cell is improved.

In the fuel cell according to the embodiment, a plurality of fine pores may be provided in the current collector regularly.

According to this embodiment, uniform opening ratio of the current collector results in the planar direction and location-dependent variation in fuel and air diffusion performance is reduced so that the operating stability of the fuel cell is improved.

BRIEF DESCRIPTION OF THE DRAWINGS

FIG. 2A is a sectional view of the fuel cell according to the first embodiment along a line A-A' of FIG. 1.

FIG. 2B is a sectional view of the fuel cell according to the first embodiment along a line B-B' of FIG. 1.

FIG. 6A is a top view of the current collector and the anode catalyst layer.

FIG. 6B is a sectional view along a line C-C' of FIG. 6A.

DETAILED DESCRIPTION OF THE INVENTION

The invention will now be described by reference to the preferred embodiments. This does not intend to limit the scope of the present invention, but to exemplify the invention.

First Embodiment

Figure 1:
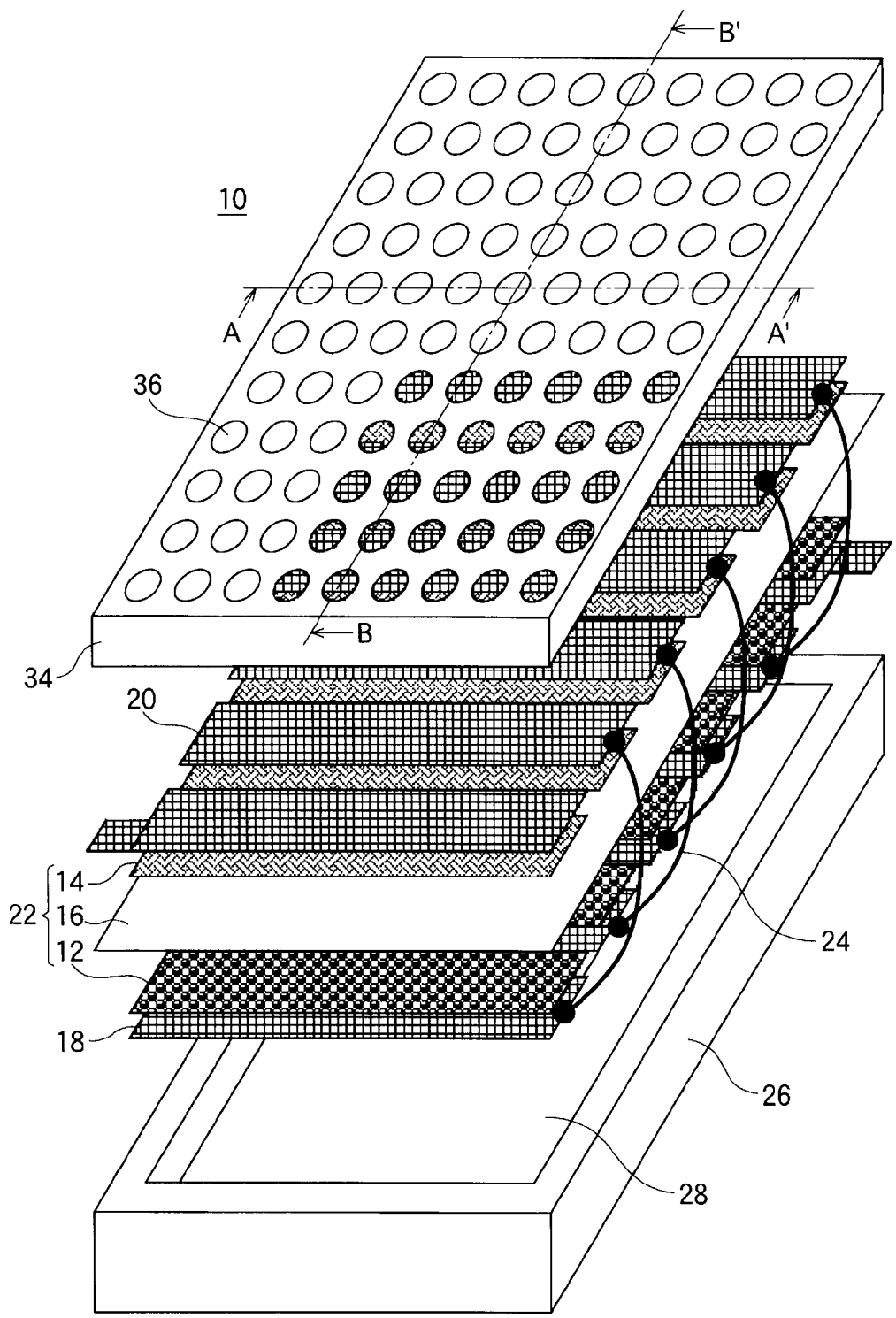
FIG. 1 is a fragmentary perspective view of a fuel cell according to a first embodiment.

FIG. 1 is a fragmentary perspective view of a fuel cell according to a first embodiment. FIG. 2A is a sectional view along a line A-A' of FIG. 1, and FIG. 2B is a sectional view along a line B-B' of FIG. 1.

The fuel cell 10 comprises a plurality of cells 11 provided on a plane. Each 11 cell is provided with a membrane electrolyte assembly comprising an anode catalyst layer 12, a cathode catalyst layer 14 and an electrolyte membrane 16 sandwiched by the anode catalyst layer 12 and the cathode catalyst layer 14. Methanol water solution or pure methanol (hereinafter, referred to as methanol fuel) is supplied to the anode catalyst layer 12. Air is supplied to the cathode catalyst layer 14. The fuel cell 10 generates electricity by an electrochemical reaction induced between methanol in the methanol fuel and oxygen in the air.

Preferably, the electrolyte membrane 16 exhibits good ionic conductivity in a humid condition and functions as an ion exchange membrane causing protons to travel between the anode catalyst layer 12 and the cathode catalyst layer 14. The electrolyte membrane 16 is formed of a solid polymer material such as fluorinated polymer or non-fluorinated polymer. For example, perfluorocarbon polymer of a sulfonic acid type, polysulfone resin, or perfluorocarbon polymer having a phosphonic acid group or carboxylic acid group may be used. Nafion (trademark) 112 from DuPont is an example of perfluorocarbon polymer of a sulfonic acid type. Aromatic sulfonated polyetheretherketone and sulfonated polysulfone are examples of non-fluorinated polymer.

The electrolyte membrane 16 is bonded to one surface of the anode catalyst layer 12 and a current collector 18 is bonded to the other surface of the anode catalyst layer 12. The structure is obtained by forming the anode catalyst layer 12 on the electrolyte membrane 16 by spray coating, screen printing or decalcomania transferring, and then placing the current collector 18 on the layer 12. The current collector 18 will be described in detail later. An anode side gasket 40 is provided at a portion of the anode catalyst layer 12 peripheral to the electrolyte membrane 16. An anode side housing 26 is provided via the anode side gasket 40. The anode side housing 26 forms a fuel chamber 70 storing methanol fuel. The longitudinal end of the current collector 18 is held in place by the anode side gasket 40. The methanol fuel stored in the fuel chamber 70 is directly supplied to the anode catalyst layer 12.

An opening 27 is provided in the major surface of the anode side housing 26. A vapor-liquid separating filter 28 is provided interior to the opening 27. Gas generated in the anode is discharged outside by passing through the vapor-liquid separating filter 28 and through the opening 27. It is preferable that the anode side housing 26 have properties such as methanol resistance, acid resistance and mechanical rigidity.

Stainless steel metals, titan metals, acrylic resin, epoxy and glass epoxy resin are examples of material to form the anode side housing 26.

The anode side housing 26 is provided with a fuel intake (not shown) for taking in methanol fuel from a fuel tank (not shown) provided outside the fuel cell 10 so that methanol fuel is supplied to the fuel chamber 70 appropriately.

The electrolyte membrane 16 is bonded to one surface of the cathode catalyst layer 14 and a current collector 20 is bonded to the other surface of the cathode catalyst layer 14. The structure of the current collector 20 is the same as that of the current collector 18. A cathode side gasket 42 is provided at a portion of the cathode catalyst layer 14 peripheral to the electrolyte membrane 16. A cathode side housing 34 is provided via the cathode side gasket 42. The longitudinal end of the current collector 20 is held in place by the cathode side gasket 42. An air intake opening 36 is provided in the major surface of the cathode side housing 34. Air flowing in through the air intake opening 36 arrives at the cathode catalyst layer 14. The same material as used to form the anode side housing 26 may be used to form the cathode side housing 34.

The cells 11 are electrically connected in series. More specifically, the current collector 18 of one cell is connected to the current collector 20 of the adjacent cell via a wiring 24.

A description will now be given of the current collector used in this embodiment. Since the current collector 18 and the current collector 20 are similarly structured, the current collector 18 will be described by way of example.

Properties required of a base material of the current collector 18 are conductivity and rigidity. Examples of such material include copper-based materials such as oxygen free copper, tough pitch copper, phosphor bronze, brass and beryllium copper. Other examples are nickel alloys such as Kovar (registered trademark), a permalloy, Nichrome (registered trademark), amber and Inconel (registered trademark). Still other examples are flat metal sheets formed of nickel alloy, SUS, molybdenum or aluminum alloy.

It is preferable that the base material of the current collector 18 be coated with a corrosion resistant metal such as gold or platinum. The thickness of the corrosion resistant metal is, for example, not more than 100 nm. Sputtering or plating may be employed to coat the base material of the current collector 18 with the corrosion resistant metal. By coating the base material of the current collector 18 with a corrosion resistant metal, the cost is reduced and the conductivity of the current collector 18 is improved. Moreover, the metallic base material constituting the current collector 18 is prevented from being dissolved so that the operating stability of the fuel cell is improved.

Since the current collector 18 is rigid, close contact between the current collector 18 and the anode catalyst layer 12 is maintained even if the current collector 18 is not pressed by a support such as ribs. As a result of reducing the number of members to achieve close contact between the current collector 18 and the anode catalyst layer 12, the structure of the fuel cell is simplified, maintenance is made easy and production cost is reduced. The provision also reduces load imposed by clamping members such as bolts and nuts on the casing of the fuel cell. Consequently, the casing, the catalyst layer, etc. of the fuel cell can be made thin, resulting in a compact fuel cell.

A plurality of fine pores are provided to extend through the current collector 18 in a direction substantially perpendicular to the planar direction. The fine pores may be provided by forming a mask having openings of a predetermined shape on a metal sheet by lithography, and by selectively etching the metal sheet. Liquid fuel is supplied to the anode catalyst layer 12 via the fine pores provided in the current collector 18.

The plurality of fine pores are preferably provided regularly in the current collector 18. This provides uniform opening ratio of the current collector 18 in the planar direction and reduces location-dependent variation in air diffusion performance, thereby improving operating stability of the fuel cell.

The fine pores provided in the current collector 18 may have the shape of a regular triangle, square, orthohexagon, etc. Alternatively, a combination of two or more of these shapes may be used.

Figure 3:
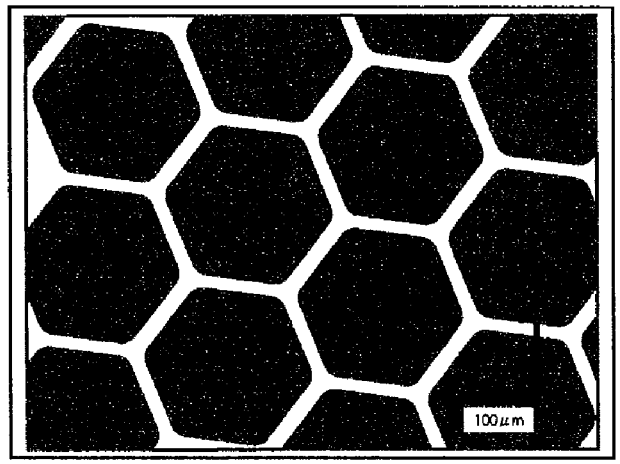
FIG. 3 shows a micrograph of a current collector fabricated by employing SUS as a base material.

FIG. 3 shows a micrograph of a current collector fabricated by employing SUS as a base material.

In this example, the fine pore has an orthohexagonal shape so that the current collector 18 has a honeycomb structure. By employing a honeycomb structure to form the current collector 18, the fine pores are efficiently laid out, and the rigidity is improved.

Figure 4:
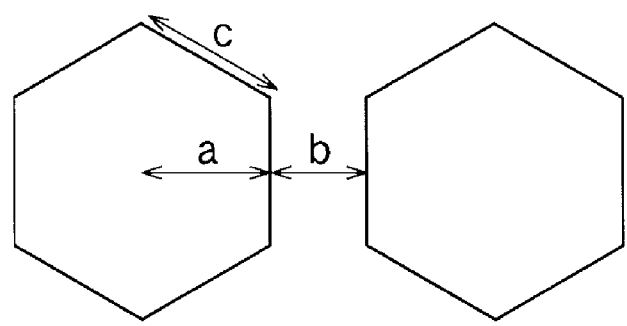
FIG. 4 shows dimensions of the current collector having a honeycomb structure.

Table 1 lists exemplary dimensions of the current collector having a honeycomb structure. a, b and c in Table 1 represent the distance from the center of the pore to the side of the orthohexagon, the distance between the adjacent sides of the orthohexagon and the length of each side of the orthohexagon, respectively (see FIG. 4). The opening ratio is given by the following expression.

opening ratio=total area/(total area of fine pores+area occupied by current collector)×100

TABLE 1

| a (μm) | b (μm) | c (μm) | OPENING RATIO (%) | THICKNESS (μm) |
|---|---|---|---|---|
| 95 | 20 | 109.7 | 81.9 | 50 |
| 62.5 | 25 | 72.2 | 69.4 | 30 |
| 100 | 40 | 115.5 | 69.4 | 50 |
| 200 | 80 | 230.9 | 69.4 | 50 |
| 500 | 200 | 577.4 | 69.4 | 50 |
| 100 | 80 | 115.5 | 51.0 | 50 |
| 500 | 80 | 577.4 | 85.7 | 50 |

Our experiments with generating electricity using the honeycomb-structure current collector with the listed dimensions showed without exception that close contact between the current collector and the electrode is favorable and the output is satisfactory and stable. From the perspective of securing diffusibility of fuel and air, the opening ratio of the current collector 18 is favorably 50-90%.

Figure 5:
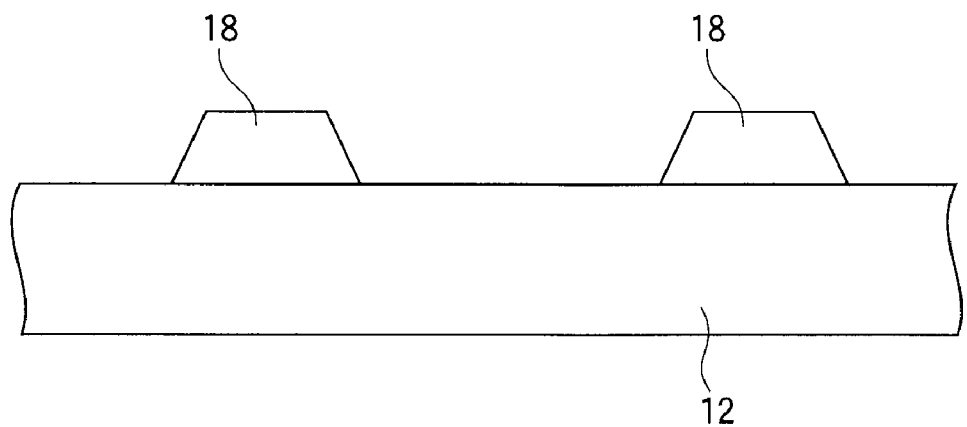
FIG. 5 shows the cross section of the current collector.

The cross section of the current collector 18 is favorably a trapezoid with the side lying on the electrode side being the longer side (see FIG. 5). By configuring the current collector 18 to have a trapezoidal cross section, the bottom area of the current collector 18 is increased, and the area of contact between the current collector 18 and the anode catalyst layer 12 is increased accordingly. As a result, contact resistance between the current collector 18 and the anode catalyst layer 12 is increased.

Figure 6A:
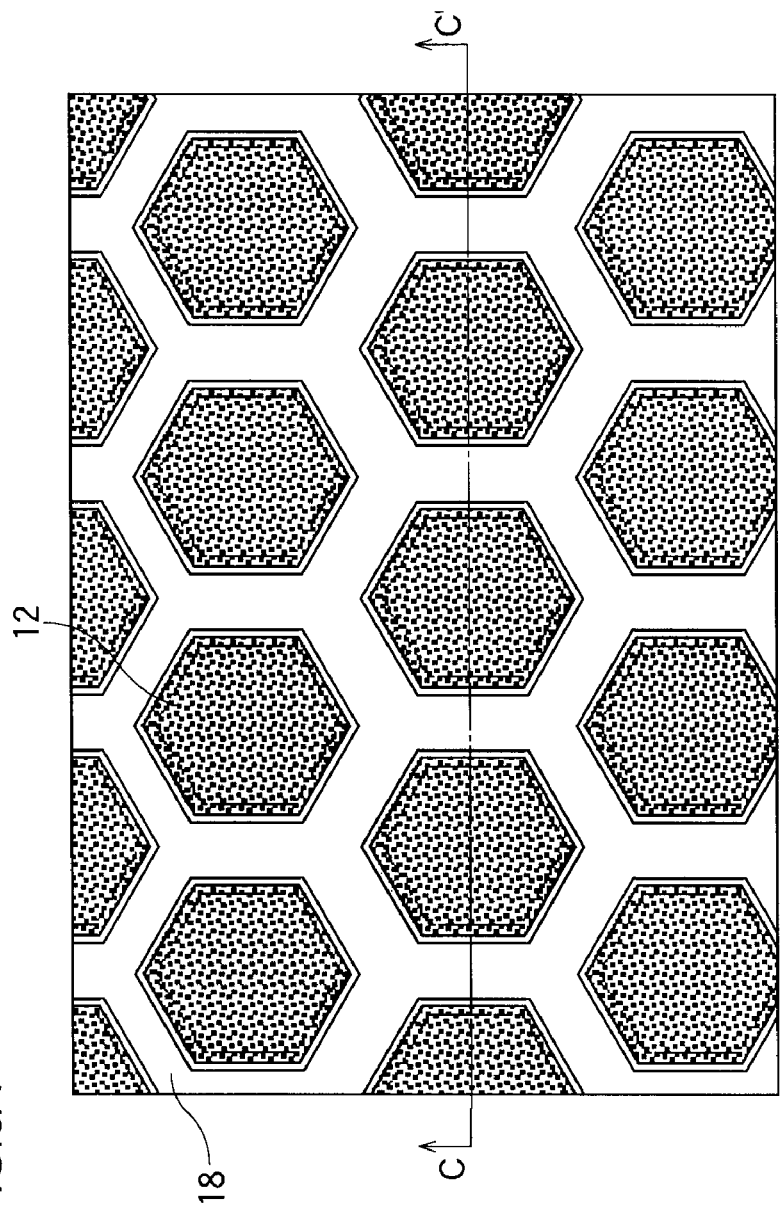
FIGS. 6A and 6B show an exemplary structure including the current collector and an anode catalyst layer joined.
Figure 6B:
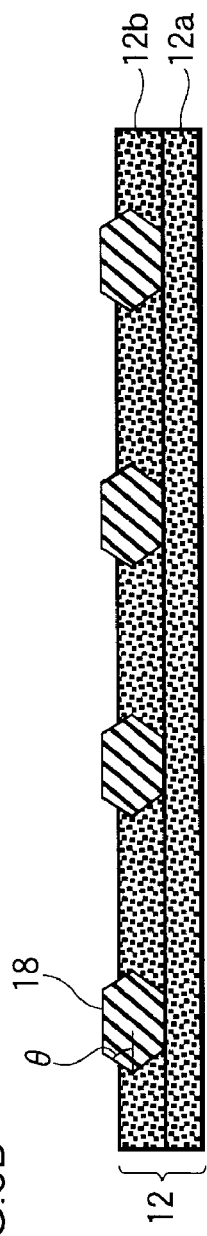
Figure 7:
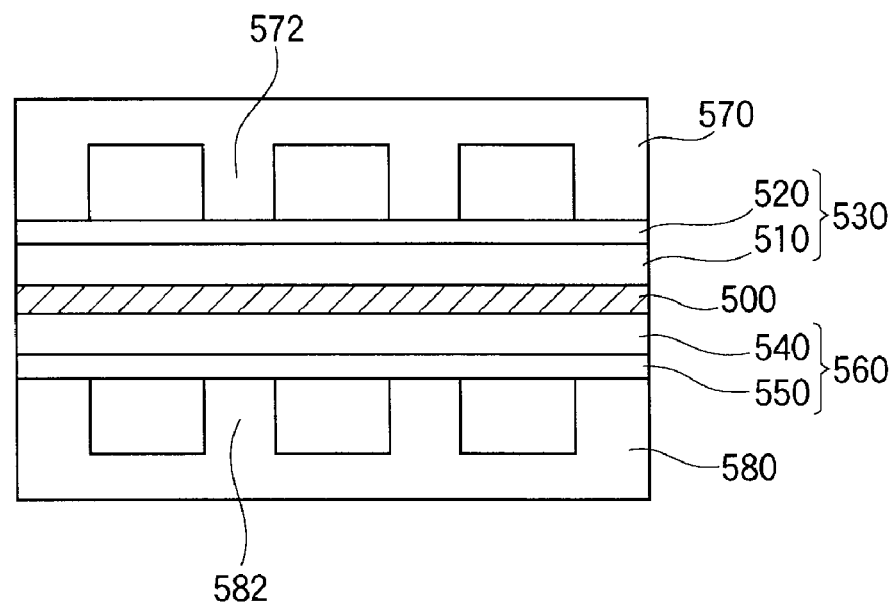
FIG. 7 is a sectional view showing a related-art DMFC.

FIGS. 6A and 6B show an exemplary structure including the current collector 18 and the anode catalyst layer 12 joined. In the illustrated example, the bottom of the current collector 18 is embedded in the anode catalyst layer 12. This promotes close contact between the current collector 18 and the anode catalyst layer 12 and reduces the likelihood of the current collector 18 being peeled off from the anode catalyst layer 12. If the current collector 18 is to be embedded in the anode catalyst layer 12, the sides of the fine pores of the current collector 18 is preferably tapered so that the vertex of the fine pore side is embedded in the anode catalyst layer 12. The typical angle of taper ($\theta$ shown in FIG. 6B) of the fine pore side is 60-70°. This promotes close contact between the current collector 18 and the anode catalyst layer 12. The current collector with the cross section shown in FIGS. 6A and 6B may be obtained by providing a resist mask on both surfaces thereof and then etching the material.

The structure in which the current collector 18 is embedded in the anode catalyst 12 is obtained by providing the current collector 18 on an anode catalyst 12a as a base, and then forming an anode catalyst layer 12b by spraying or the like.

In the example shown in FIGS. 6A and 6B, the current collector 18 is partially embedded in the anode catalyst layer 12. Alternatively, the entirety of the current collector 18 may be embedded in the anode catalyst layer 12 with the surface of the current collector 18 remaining exposed.

Second Embodiment

One mode of practicing the embodiment is a fuel cell. The fuel cell comprises: an electrolyte membrane; a first electrode bonded to one surface of the electrolyte membrane; a second electrode bonded to the other surface of the electrolyte membrane; a first current collector which is provided between the electrolyte membrane and the first electrode and which is in contact with the first electrode such that at least a part of the first current collector is embedded in the electrolyte membrane; and a second current collector which is in contact with the second electrode.

According to this mode, swelling of the electrolyte membrane bonded to the first electrode is suppressed by the current collector as liquid fuel is supplied. Therefore, methanol crossover is suppressed by inhibiting penetration of methanol from the first electrode to the electrolyte membrane. The provision also firmly secures the first current collector in its place and thus eliminates the need for a fixture to clamp the first current collector. Thereby, the thickness of the fuel cell is reduced.

The surface of the first current collector according to this mode may be coated with a conductive material having corrosion resistance. In this way, corrosion of the first current collector is suppressed, and the life of the fuel cell is extended.

In this mode, the first current collector and the electrolyte membrane may be chemically bonded. This promotes close contact between the first current collector and the electrolyte membrane and reduces the likelihood of the first current collector being peeled off from the electrolyte membrane. Covalent bond, coordinate bond and ionic bond are examples of chemical bond. By promoting close contact between the first current collector and the electrolyte membrane, swelling of the electrolyte membrane facing the first current collector is suppressed. Therefore, the electrolyte membrane undergoes less change in form in a wet-dry cycle. Rupture, at the interface between the electrolyte membrane and the current collector, and resultant cross leak of the electrolyte membrane are less likely to occur. As a result, durability of the fuel cell is improved. The fuel cell may be a polymer electrolyte fuel cell (PEFC) instead of a DMFC. By promoting close contact between the first current collector and the electrolyte membrane, methanol crossover is more successfully suppressed.

In this mode, the second current collector may be provided between the electrolyte membrane and the second electrode, and the second current collector may be in contact with the second electrode such that at least a part of the second current collector is embedded in the electrolyte membrane at a distance from the first current collector. According to this provision, swelling of the electrolyte membrane facing the second current collector is also suppressed. As a result, methanol crossover is more successfully suppressed and thickness reduction of the fuel cell is further promoted.

The surface of the second current collector according to this mode may be coated with a conductive material having corrosion resistance. In this way, corrosion of the second current collector is suppressed, and the life of the fuel cell is extended.

In this mode, the second current collector and the electrolyte membrane may be chemically bonded. This promotes close contact between the second current collector and the electrolyte membrane and reduces the likelihood of the second current collector being peeled off from the electrolyte membrane. Covalent bond, coordinate bond and ionic bond are examples of chemical bond. By promoting close contact between the second current collector and the electrolyte membrane, swelling of the electrolyte membrane facing the second current collector is suppressed. Therefore, the electrolyte membrane undergoes less change in form in a wet-dry cycle. Rupture, at the interface between the electrolyte membrane and the current collector, and resultant cross leak of the electrolyte membrane are less likely to occur. As a result, durability of the fuel cell is improved. By promoting close contact between the first current collector and the electrolyte membrane, methanol crossover is more successfully suppressed. Since close contact between the first current collector and the electrolyte membrane is promoted and close contact between the second current collector and the electrolyte membrane is promoted, power is collected without using a clamping member such as a screw. Another mode of practicing the second embodiment is also a fuel cell. The fuel cell comprises: an electrolyte membrane; a first electrode bonded to one surface of the electrolyte membrane; a second electrode bonded to the other surface of the electrolyte membrane; a first current collector which is provided between the electrolyte membrane and the first electrode and which is in contact with the first electrode such that at least a part of the first current collector is embedded in the electrolyte membrane; and a second current collector which is in contact with the second electrode, wherein the first current collector and the electrolyte membrane are chemically bonded, the sides of the first current collector are tapered, and the surface of the first current collector is coated with a conductive material having corrosion resistance. By promoting close contact between the first current collector and the electrolyte membrane, swelling of the electrolyte membrane facing the first current collector is suppressed. Therefore, the electrolyte membrane undergoes less change in form in a wet-dry cycle. Rupture, at the interface between the electrolyte membrane and the current collector, and resultant cross leak of the electrolyte membrane are less likely to occur. As a result, durability of the fuel cell is improved. The fuel cell may be a polymer electrolyte fuel cell (PEFC) instead of a DMFC. By promoting close contact between the first current collector and the electrolyte membrane, methanol crossover is more successfully suppressed. Since the sides of the first current collector are tapered and anchored in the electrolyte membrane, close contact between the first current collector and the electrolyte membrane is promoted. This reduces the likelihood of the first current collector being peeled off from the electrolyte membrane. In this mode, the second current collector may be provided between the electrolyte membrane and the second electrode. The second current collector may be in contact with the second electrode such that at least a part of the second current collector is embedded in the electrolyte membrane at a distance from the first current collector. The second current collector and the electrolyte membrane may be chemically bonded, the sides of the second current collector may be tapered, and the surface of the second current collector may be coated with a conductive material having corrosion resistance. According to this mode, close contact between the second current collector and the electrolyte membrane is promoted and, therefore, swelling of the electrolyte membrane facing the second current collector is suppressed. Therefore, the electrolyte membrane undergoes less change in form in a wet-dry cycle. Rupture, at the interface between the electrolyte membrane and the current collector, and resultant cross leak of the electrolyte membrane are less likely to occur. As a result, durability of the fuel cell is improved. By promoting close contact between the second current collector and the electrolyte membrane, methanol crossover is more successfully suppressed. Since the sides of the second current collector are tapered and anchored in the electrolyte membrane, close contact between the second current collector and the electrolyte membrane is promoted. This reduces the likelihood of the second current collector being peeled off from the electrolyte membrane. Since close contact between the first current collector and the electrolyte membrane is promoted and close contact between the second current collector and the electrolyte membrane is promoted, power is collected without using a clamping member such as a screw.

Combinations of the aforementioned elements are also within the scope of the invention sought to be protected by this patent application.

Best Exemplary Embodiments for Practicing the Second Embodiment

Figure 8:
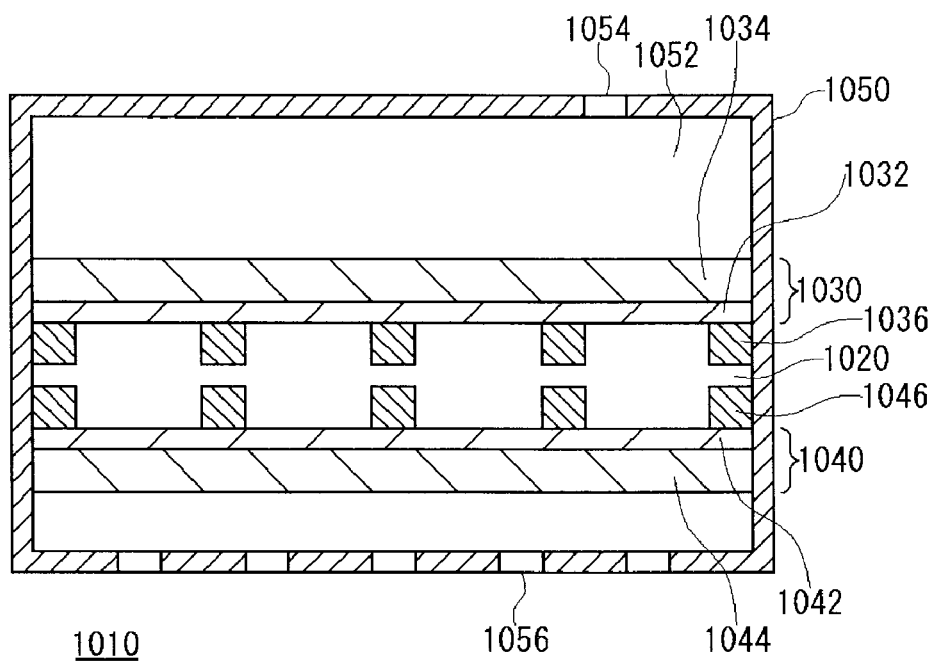
FIG. 8 shows the structure of a fuel cell according to a first exemplary embodiment of a second embodiment.

FIG. 8 is a schematic diagram showing the structure of a fuel cell according to a first exemplary embodiment. A fuel cell 1010 is provided with a membrane electrode assembly (hereinafter, referred to as MEA) including an electrolyte membrane 1020, an anode 1030 bonded to one surface of the electrolyte membrane 1020 and a cathode 1040 bonded to the other surface of the electrolyte membrane 1020. The cell generates power by inducing an electrochemical reaction between methanol water solution as liquid fuel and air.

Preferably, the electrolyte membrane 1020 exhibits good ionic conductivity in a humid condition and functions as an ion exchange membrane causing protons to travel between an anode catalyst layer 1032 constituting the anode 1030 and a cathode catalyst layer 1042. The electrolyte membrane 1020 is formed of a solid polymer material such as fluorinated polymer or non-fluorinated polymer. For example, perfluorocarbon polymer of a sulfonic acid type, polysulfone resin, or perfluorocarbon polymer having a phosphonic acid group or carboxylic acid group may be used. Nafion (trademark)

112 from DuPont is an example of perfluorocarbon polymer of a sulfonic acid type. Aromatic sulfonated polyetheretherketone and sulfonated polysulfone are examples of non-fluorinated polymer.

The anode catalyst layer 1032 is bonded to one surface of the electrolyte membrane 1020. The anode catalyst layer 1032 comprises an ion exchange resin and carbon particles carrying a catalyst (i.e., catalyst-carrying carbon particles). The ion exchange resin connects the catalyst-carrying carbon particles with the electrolyte membrane 1020 so as to conduct protons between the particles and the membrane. The ion exchange resin may be formed of a polymer material similar to the one that forms the electrolyte membrane 1020. The catalyst carried may be a mixture comprising one or two of platinum, ruthenium and rhodium. For example, the catalyst-carrying carbon particles may be acetylene black, Ketjen Black (trademark) or carbon nanotube.

An anode diffusion layer 1034 constituting the anode 1030 is provided on the anode catalyst layer 1032 so as to face the same surface of the electrolyte membrane 1020. The anode diffusion layer 1034 may be formed of, for example, a porous material such as carbon paper, carbon resin cloth or carbon resin nonwoven fabric. The layer 1034 may be coated with gas diffusion paste including water repellent fluororesin such as tetrafluoroethylene resin (PTFE). The anode diffusion layer 1034 may be conductive or insulating. While the anode 1030 is preferably provided with the anode diffusion layer 1034, the anode diffusion layer 1034 is not essential.

The anode diffusion layer 1034 faces a fuel storage 1052 formed by a housing 1050. Methanol water solution stored in the fuel storage 1052 permeates to the layer 1034.

A vapor-liquid separating filter 1054 is provided in the housing 1050 so as to discharge generated gas collected in the fuel storage 1052 outside.

In the first exemplary embodiment, an anode current collector 1036 is provided between the electrolyte membrane 1020 and the anode catalyst layer 1032. The anode current collector 1036 is embedded in the electrolyte membrane 1020 and, in this state, is in contact with and electrically connected with the anode catalyst layer 1032. The entirety of the anode current collector 1036 of the first exemplary embodiment is embedded in the electrolyte membrane 1020 so that the surface of contact between the anode current collector 1036 and the anode catalyst layer 1032 is flush with the surface of bond between the electrolyte membrane 1020 and the anode catalyst layer 1032. Alternatively, a part of the anode current collector 1036 may be embedded in the electrolyte membrane 1020 and the remaining part may be embedded in the anode catalyst layer 1032.

Any material may be used to form the anode current collector 1036 so long as the material has conductivity. For example, metals, conductive ceramics, semiconductors such as Si, carbon and insulating members coated with a conductive material may be used.

Figure 9:
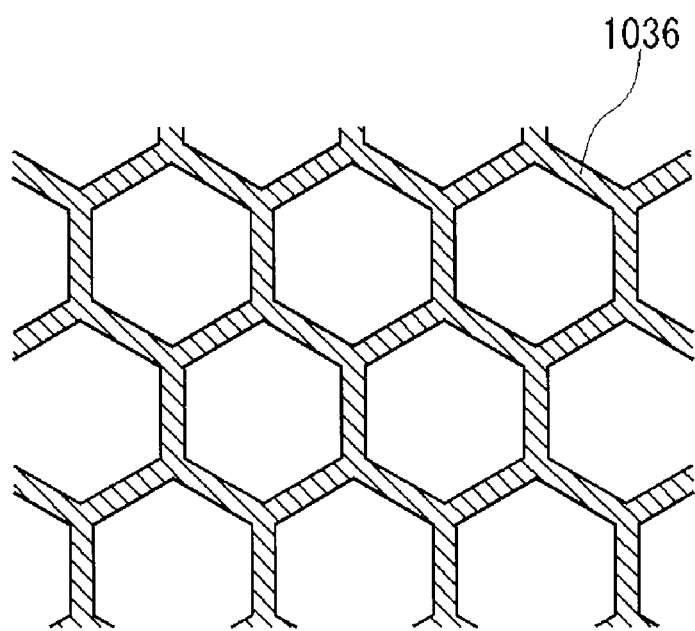
FIG. 9 shows an exemplary shape of an anode current collector.
Figure 10:
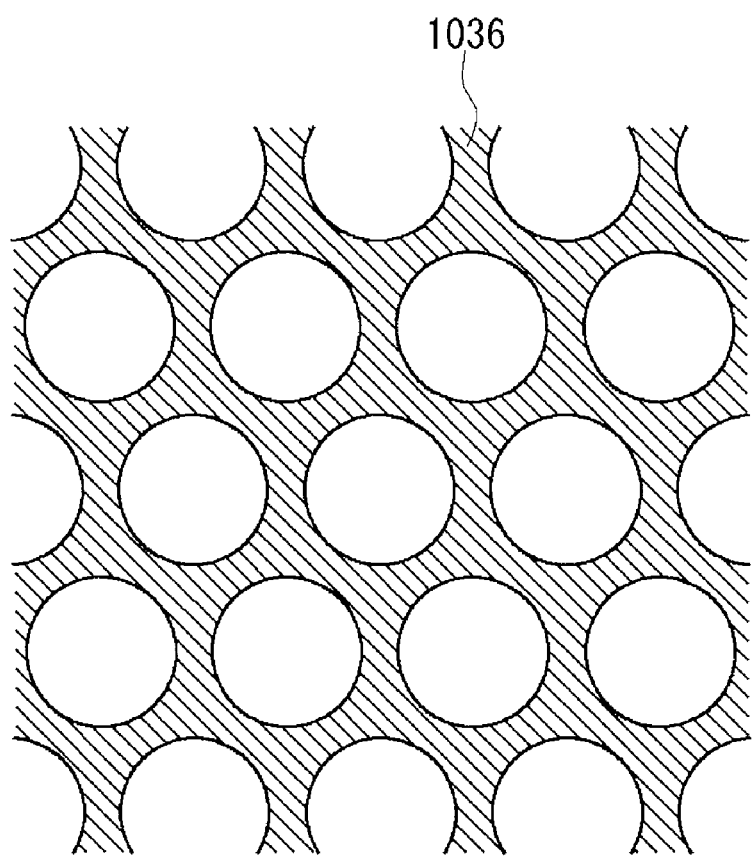
FIG. 10 shows another exemplary shape of an anode current collector.

The anode current collector 1036 may be of any shape so long as there are provided through holes through which protons can travel from the anode catalyst layer 1032 to the electrolyte membrane 1020. For example, the anode current collector 1036 may have a honeycomb structure as shown in FIG. 9 having a plurality of orthohexagonal through holes. By configuring the anode current collector 1036 to have a honeycomb structure, rigidity of the current collector is improved. FIG. 10 shows an alternative shape of the anode current collector 1036. In the illustrated example, a plurality of circular through holes are provided in a conductive sheet. The opening ratio of the through holes may be 10-90% with respect to the total area of the surface of contact with the anode catalyst layer 1032. By ensuring that the opening ratio of the through holes is within the state range, requirements for proton conductivity and power collection capability are both met.

Preferably, the surface of the anode current collector 1036 is coated with a protective layer made of a metal having corrosion resistance. Au and Pt are examples of corrosion resistant metals. The protective layer suitably has a thickness of 1 nm-100 nm. The current collector may be coated with a corrosion resistant metal by deposition, plating or the like. The protection ensures that the anode current collector 1036 is less likely to be corroded so that the life of the fuel cell 1010 is extended.

Wet etching, dry etching or aluminum anodization may be used to fabricate the anode current collector 1036 described above.

Preferably, the top surface of the anode current collector 1036 is modified by a functional group, such as an OH group and a COOH group, which is highly reactive to the electrolyte membrane 1020. More preferably, the functional group and the electrolyte membrane 1020 are covalently bonded. Introduction of the functional group into the top surface of the anode current collector 1036 may be possible by irradiating the collector 1036 with plasma, ultraviolet rays, electron beams or the like.

This promotes close contact between the anode current collector 1036 and the electrolyte membrane 1020 and reduces the likelihood of the anode current collector 1036 being peeled off from the electrolyte membrane 1020.

Preferably, the top surface of the anode current collector 1036 and the electrolyte membrane 1020 are chemically bonded. Chemical bond may be of any type such as covalent bond, coordinate bond and ionic bond. This promotes close contact between the anode current collector 1036 and the electrolyte membrane 1020 and reduces the likelihood of the anode current collector 1036 being peeled off from the electrolyte membrane 1020.

The cathode catalyst layer 1042 bonded to the other surface of the electrolyte membrane 1020. Further, the cathode diffusion layer 1044 is provided adjacent to the cathode catalyst layer 1042. Materials that can be used for the cathode catalyst layer 1042 and the cathode diffusion layer 1042 are the same as those for the anode catalyst layer 1032 and the anode diffusion layer 1034 so that the description thereof is omitted. An air intake 1056 is provided in the housing 1050 on the cathode side so that air necessary for electrochemical reaction is supplied from outside the cell.

In the first exemplary embodiment, the cathode current collector 1046 is provided between the electrolyte membrane 1020 and the cathode catalyst layer 1042. The cathode current collector 1046 is embedded in the electrolyte membrane 1020 and, in this state, is in contact with and electrically connected with the cathode catalyst layer 1042. The entirety of the cathode current collector 1046 of the first exemplary embodiment is embedded in the electrolyte membrane 1020 so that the surface of contact between the cathode current collector 1046 and the cathode catalyst layer 1032 is flush with the surface of bond between the electrolyte membrane 1020 and the cathode catalyst layer 1042. Alternatively, a part of the cathode current collector 1046 may be embedded in the electrolyte membrane 1020 and the remaining part may be embedded in the cathode catalyst layer 1042. The shape of the cathode current collector 1046 and the material thereof are the same as those of the anode current collector 1036 so that the description thereof is omitted.

The anode current collector 1036 and the cathode current collector 1046 of the fuel cell 1010 described above are at least partly embedded in the electrolyte membrane 1020 so as to hold the electrolyte membrane 1020 in place. Therefore, the electrolyte membrane 1020 is less likely to swell and, as a result, methanol crossover is suppressed. The anode current collector 1036 and the cathode current collector 1046 are at least partly embedded in the electrolyte membrane 1020 and are sandwiched between the electrolyte membrane 1020 and the respective catalyst layers. According to this provision, the anode current collector 1036 and the cathode current collector 1046 are firmly secured so that a clamping fixture for securing the collectors 1036 and 1046 are not necessary. As a result, the thickness of the fuel cell is reduced. Accordingly, the exemplary embodiment is applicable not only to DMFCs but also to solid electrolyte membrane fuel cells (PEFCs).

Preferably, the anode current collector 1036 and the cathode current collector 1046 are almost halfway embedded in the electrolyte membrane 1020, the diameter of the through holes provided in the anode current collector 1036 and the cathode current collector 1046 is as small as possible. For example, the diameter is preferably on the order of 0.01 µm-100 µm and, more preferably, 0.1 µm-10 µm. If the diameter of the through holes is less than 0.01 µm, molecules constituting the electrolyte membrane 1020 cannot easily enter the through holes. If the diameter is more than 1000 µm, it is difficult to suppress swelling of the electrolyte membrane 1020 and resistance is increased in collecting power. By ensuring that the diameter of the through holes is on the order of 0.1 µm-10 µm, swelling of the electrolyte membrane 1020 is more properly suppressed.

Method of Embedding the Current Collector in the Electrolyte Membrane

Figure 11A:
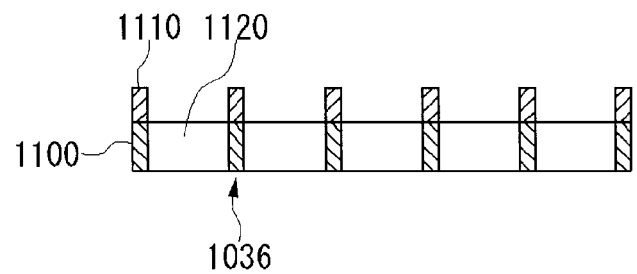
FIGS. 11A-11E show steps of embedding a current collector in an electrolyte membrane.

A description will now be given of a method of embedding the current collector in the electrolyte membrane. As shown in FIG. 11A, the anode current collector 1036 is fabricated by forming a plurality of through holes 1120 by dry-etching an Si sheet (a membrane thickness of about 1 µm) using a pre-patterned photoresist 110 as a mask. The surface of the anode current collector 1036 is then coated with Au by sputtering. A functional group such as an OH group or a COOH group is introduced by irradiating the surface with plasma.

Figure 11B:
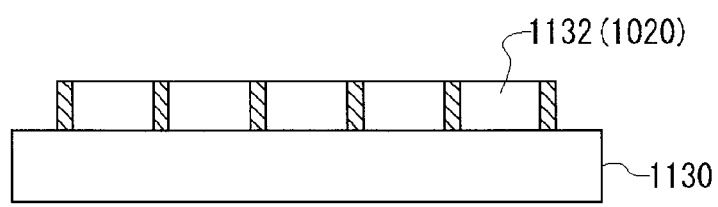
Figure 11C:
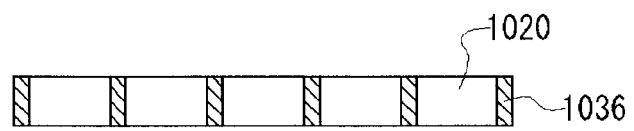

As shown in FIG. 11B, the photoresist 110 is then removed, and an electrolyte solution 1132 is applied to an assembly comprising a flat base material 1130 and the anode current collector 1036 placed thereon so as to form the electrolyte membrane 1020. An electrolyte monomer may be applied instead of an electrolyte solution and then be polymerized. According to this approach, covalent bond between the electrolyte membrane 1020 and the functional group is promoted so that close contact between the anode current collector 1036 and the electrolyte membrane 1020 is promoted. Presence of covalent bond between the electrolyte membrane 1020 and the functional group may be confirmed by analysis methods like XPS and IR. As shown in FIG. 11C, by peeling the anode current collector 1036 from the base material 1130, a member is fabricated in which the anode current collector 1036 is embedded in the electrolyte membrane 1020 with a part of the anode current collector 1036 being exposed.

Figure 11D:
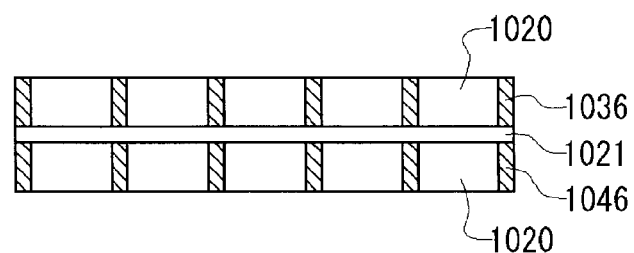
Figure 11E:
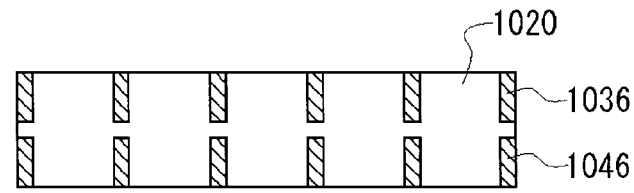

A member in which the cathode current collector 1046 is embedded in the electrolyte membrane 1020 is fabricated through the same steps described above. As shown in FIG. 11D, the members are assembled, with the anode current collector 1036 and the cathode current collector 1046 being opposite to each other, and are adhered to each other via an electrolyte solution or an electrolyte membrane 1021 (membrane thickness of about 1 µm). In this way, a member is fabricated as shown in FIG. 11E in which the anode current collector 1036 and the cathode current collector 1046 are embedded in the electrolyte membrane 1020, creating a gap between the collectors. The collectors are partly exposed in the respective surfaces of the electrolyte membrane 1020. By bonding electrodes each comprising a catalyst layer and a diffusion layer to this member, an MEA with built-in collectors is fabricated. By adhering the anode current collector 1036 and the cathode current collector 1046 to each other via the electrolyte membrane 1020 as described above, short circuit in the MEA is prevented. By ensuring that the anode current collector 1036 and the cathode current collector 1046 are opposite to each other, proton conduction in the direction of thickness of the electrolyte membrane 1020 is not prevented so that favorable proton conduction is maintained.

The present invention is not limited to the embodiments described above. Various modifications such as design variations may be made on the basis of the knowledge of skilled persons. The embodiments with such modifications are also within the scope of the present invention.

Figure 12:
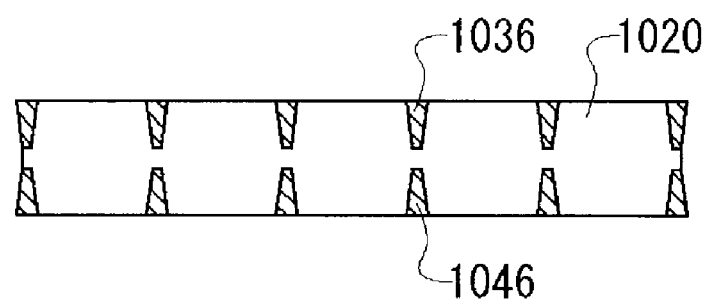
FIG. 12 shows the cross section of the current collector.

For example, while the current collector with a rectangular cross section is illustrated in the first exemplary embodiment, the cross section of the current collector may have other shapes. For example, the current collectors 1036 and 1046 may have a tapered cross section as shown in FIG. 12. In this way, the current collectors may be embedded by hot press in the electrolyte membrane more properly and easily.

In the first exemplary embodiment, at least a part of the anode current collector and the cathode current collector is embedded in the electrolyte membrane. Alternatively, one of the anode current collector and the cathode current collector may be provided outside the diffusion layer and secured in place by a clamping fixture or the like. The electrolyte membrane swells more pronouncedly on the anode side to which fuel is supplied. Accordingly, it is favorable to embed a part of the anode current collector in the electrolyte membrane.

In the first exemplary embodiment, the current collector itself is conductive. Alternatively, a porous insulating material such as porous polytetra fluoroethylene (PTFE) membrane, a heat-resistant cross-linked polyethylene (CLPE) base material or a porous polyimide may be used to form the base material of the current collector. The base material may be coated with a conductive material having corrosion resistance such as metal or carbon.

In the exemplary embodiment 1, the structure in which the anode current collector and the cathode current collector are opposite to each other is illustrated. Alternatively, the anode current collector and the cathode current collector may be displaced from each other. With this structure, rigidity of the electrolyte membrane is enhanced.

The fuel cell may be of an active type in which an auxiliary unit such as a pump is employed for fuel supply and circulation in the fuel cell. Alternatively, auxiliary units may not be used, and the fuel cell may be of a passive type in which fuel and air are supplied to the fuel cell by convection or concentration gradient.

What is claimed is:
1. A fuel cell comprising:
an electrolyte membrane;
a first electrode bonded to one surface of the electrolyte membrane;
a second electrode bonded to the other surface of the electrolyte membrane;
a first current collector which is provided between the electrolyte membrane and the first electrode and which is in contact with the first electrode such that at least a part of the first current collector is embedded in the electrolyte membrane; and a flat-plate second current collector which is in contact with the second electrode and in which a plurality of fine pores are provided to extend in a direction substantially perpendicular to the planar direction of the second current collector, wherein the first current collector and the electrolyte membrane are chemically bonded, the sides of the first current collector are tapered, and the surface of the first current collector is coated with a conductive material having corrosion resistance, wherein the second current collector is provided between the electrolyte membrane and the second electrode, and the second current collector is in contact with the second electrode such that at least a part of the second current collector is embedded in the electrolyte membrane at a distance from the first current collector, and wherein the flat-plate second current collector and the electrolyte membrane are chemically bonded, the sides of the second current collector are tapered, and the surface of the second current collector is coated with a conductive material having corrosion resistance.

\* \* \* \* \*